US011405060B2

United States Patent
Duan et al.

(10) Patent No.: US 11,405,060 B2
(45) Date of Patent: Aug. 2, 2022

(54) ELECTRONIC DEVICE

(71) Applicant: Lenovo (Beijing) Co., Ltd., Beijing (CN)

(72) Inventors: Zhiyuan Duan, Beijing (CN); Aihua Tao, Beijing (CN); Peng Wang, Beijing (CN); Bo Zhu, Beijing (CN); Kangkang Chen, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/208,374

(22) Filed: Mar. 22, 2021

(65) Prior Publication Data

US 2021/0409043 A1  Dec. 30, 2021

(30) Foreign Application Priority Data

Jun. 30, 2020  (CN) .......................... 202010621796.8
Jun. 30, 2020  (CN) .......................... 202010624135.0

(51) Int. Cl.
| | | |
|---|---|---|
| *H04M 1/00* | (2006.01) | |
| *H04B 1/00* | (2006.01) | |
| *H04M 1/02* | (2006.01) | |
| *H04B 7/12* | (2006.01) | |
| *H04B 7/0404* | (2017.01) | |

(52) U.S. Cl.
CPC ......... *H04B 1/0064* (2013.01); *H04B 7/0404* (2013.01); *H04B 7/12* (2013.01); *H04M 1/0264* (2013.01); *H04M 1/0268* (2013.01); *H04M 2250/10* (2013.01)

(58) Field of Classification Search
CPC ............. H04M 1/0268; H04M 1/0266; H04M 1/0202; H04M 1/0277; H04M 2250/22; H04B 1/16; H04B 5/0081; H04B 5/02
See application file for complete search history.

(56) References Cited

U.S. PATENT DOCUMENTS

| | | | | |
|---|---|---|---|---|
| 10,785,894 B2 * | 9/2020 | Yang | .................. | H05K 7/20509 |
| 2016/0246559 A1 * | 8/2016 | Jung | ....................... | G06F 1/169 |
| 2020/0287268 A1 * | 9/2020 | Moon | .................... | H01Q 1/243 |

FOREIGN PATENT DOCUMENTS

| | | |
|---|---|---|
| CN | 104425884 A | 3/2015 |
| CN | 106067593 A | 11/2016 |
| CN | 107425284 A | 12/2017 |
| CN | 111029735 A | 4/2020 |
| CN | 111327733 A | 6/2020 |

* cited by examiner

*Primary Examiner* — Nhan T Le
(74) *Attorney, Agent, or Firm* — Anova Law Group, PLLC

(57) ABSTRACT

The present disclosure provides an electronic device. The electronic device includes a body and a display screen. The display screen is fixed to the body. A back of the body includes a spacing area not covered by the display screen, the spacing area including a conductor layer. The electronic device further includes an antenna of the electronic device disposed in the spacing area to emit or receive radio frequency signals. The antenna includes the conductor layer.

18 Claims, 9 Drawing Sheets

ELECTRONIC DEVICE

CROSS-REFERENCES TO RELATED APPLICATION

This application claims priority to Chinese Patent Application No. 202010624135.0, entitled "Electronic Device," filed on Jun. 30, 2020, and Chinese Patent Application No. 202010621796.8, entitled "An Electronic Device," filed on Jun. 30, 2020, the entire contents of both applications are incorporated herein by reference.

FIELD OF TECHNOLOGY

The present disclosure relates to the technical field of electronic devices and, more specifically, to an electronic device with wireless communication functions.

BACKGROUND

With the continuous development of science and technology, more and more electronic devices with wireless communication functions are being used in people's daily activities. The electronic devices can provide great convenience to people and are becoming indispensable tools for people.

Electronic devices can realize wireless communication functions by using antennas to emit and receive radio frequencies. In conventional electronic devices, the antennas are generally directly disposed on the circuit board of the electronic device, which will occupy a relatively large space of the circuit board, which affects the lighter and thinner design of the electronic device.

BRIEF SUMMARY OF THE DISCLOSURE

One aspect of the present disclosure provides an electronic device. The electronic device includes a body and a display screen. The display screen is fixed to the body. A back of the body includes a spacing area not covered by the display screen, the spacing area including a conductor layer. The electronic device further includes an antenna of the electronic device disposed in the spacing area to emit or receive radio frequency signals. The antenna includes the conductor layer.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only some embodiments of the present disclosure, and it is possible for those ordinarily skilled in the art to derive other drawings from such drawings without creative effort.

The structures, proportions, sizes and the like shown in the drawings of the present disclosure are merely intended to cooperatively explain the content disclosed in the specification rather than limiting implementation conditions of the present disclosure, and therefore have no technically substantial significance. Any structural modification, any change of a proportional relation or any adjustment on the size should fall within the scope covered by the technical content disclosed by the present disclosure without affecting the effects generated and the purposes achieved by the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Unless otherwise defined, all the technical and scientific terms used in the present disclosure have the same or similar meanings as generally understood by one of ordinary skill in the art. As described in the present disclosure, the terms used in the specification of the present disclosure are intended to describe example embodiments, instead of limiting the present disclosure.

Antenna is the main component of the electronic device to realize wireless communication. As described above, the antenna is generally disposed on the circuit board. Antennas of different communication standards have certain size requirements. With the diversification of wireless communication functions of electronic devices, electronic devices need to support a plurality of communication standards, therefore, a plurality of antennas are needed. The lighter and thinner design of electronic devices is the development trend of electronic devices, and the space on the circuit board is not enough for the arrangement of the antennas.

Figure 4:
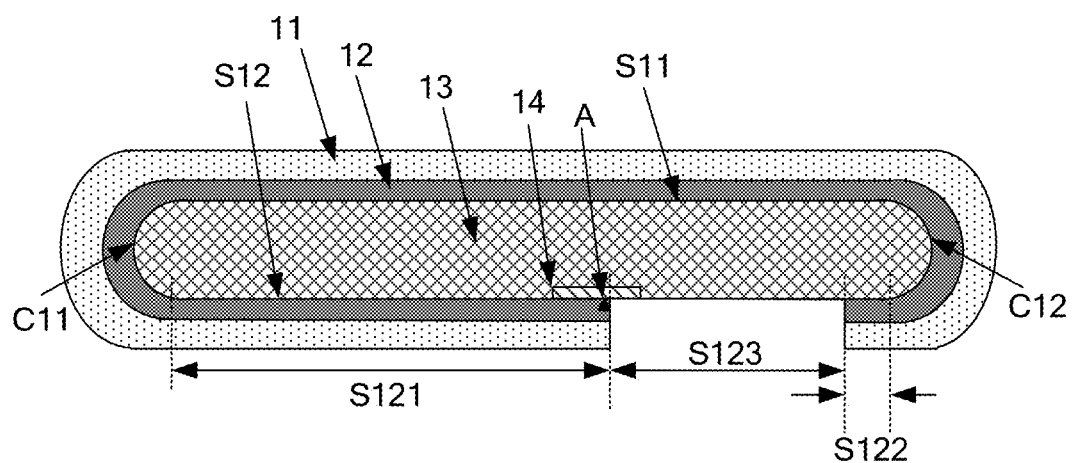
FIG. 4 is a schematic structural diagram of another electronic device according to an embodiment of the present disclosure.

Further, in a device with a large display, such as the device with a wrap-around display shown in FIG. 4, the design of the antenna may be further limited by the display size. In such a device, it is important to utilize the spacing area, such as S123, to better facilitate the antennas for the device.

For example, to ensure that antennas can emit and receive radio frequency signals normally, in some designs, not only should the antennas be positioned away from the metal components, but the antennas should also be isolated from components such as batteries, oscillators, and shields. In one design, antennas can be disposed on the sides of the electronic device not covered by the display screen to ensure that the antennas can emit/receive radio frequency signals normally. Further, an antenna may be placed in the spacing area, such as in the area around the camera, to facilitate better emitting/receiving of radio frequency signals.

In another example, the electronic device includes a body; a display screen fixed on the body, the back of the display screen including a conductor layer with an antenna feed point; and a radio frequency circuit connected to the antenna feed point such that the conductor layer can serve as the antenna of the electronic device to emit/receive radio frequency signals.

Therefore, the electronic device described in the embodiments of the present disclosure can reuse spacing area of a device, such as a wrap-around display device with the spacing area left for camera placement, as well as the conductor layer on the back of the display screen as the antenna of the electronic device to emit/receive radio frequency signals without negatively impact the display size or occupying the space on the circuit board of the electronic device. Such designs are beneficial for the lighter and thinner design of the electronic device.

In order to make the objectives, technical solutions, and advantages of the present disclosure clearer, the technical solutions in the embodiments of the present disclosure will be described below with reference to the drawings.

Figure 1:
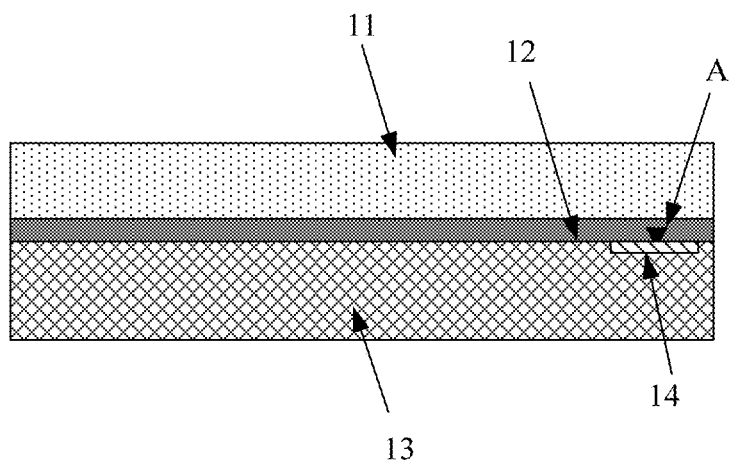
FIG. 1 is a schematic structural diagram of an electronic device according to an embodiment of the present disclosure.

FIG. 1 is a schematic structural diagram of an electronic device according to an embodiment of the present disclosure. The electronic device includes a body 13; a display screen 11, the display screen 11 being fixed to the body 13, and the back of the display screen 11 including a conductor layer 12 with an antenna feed point A; and a radio frequency circuit 14 connected to the antenna feed point A, such that the conductor layer 12 can serve as the antenna of the electronic device to emit/receive radio frequency signals.

The radio frequency circuit 14 can be disposed on the body 13. The body 13 may include a circuit board, which can be connected to the display screen 11 to control the display screen 11 to display images.

In the electronic device shown in FIG. 1, the conductor layer 12 on the back of the display screen 11 is reused as the antenna of the electronic device to emit/receive radio frequency signals without occupying the space of the circuit board of the electronic device, which is beneficial for the lighter and thinner design of the electronic device.

In some embodiment, the conductor layer 12 may be used to electromagnetically shield the display screen 11. As an electromagnetic shield layer, the conductor layer 12 can prevent the display screen 11 from being interfered by electromagnetic signals from the side of the body 13, thereby ensuring the image display quality of the display screen 11. The conductor layer 12 may be a transparent conductive film (such as a metal film or a conductive oxide film) on the entire surface, completely covering the back of the display screen 11 to achieve a better electromagnetic shielding effect. In some embodiment the conductor layer 12 may be an ITO film.

The display screen 11 may be a rigid flat panel display, and the body may have a flat plate structure. The display screen 11 and the body 13 may be directly attached and fixed to each other. The electronic device may also include a housing, and the display screen 11 and the body 13 may be disposed in the housing. In addition, the body 13 may be positioned between the display screen 11 and the bottom of the housing, the display screen 11 may be positioned at an opening of the housing, and the front of the display screen 11 may be a display surface exposed from the housing.

The display screen 11 may also be a flexible display screen that can be bent. The display screen 11 can be fixed on the body based on the shape of the body 13. In this way, the curved shape when the flexible screen is attached and fixed with the body 13 can be used, such that the conductor layer 12 can have a corresponding shape, thereby realizing the function of tuning the frequency to obtain the requirement frequency band.

Figure 2:
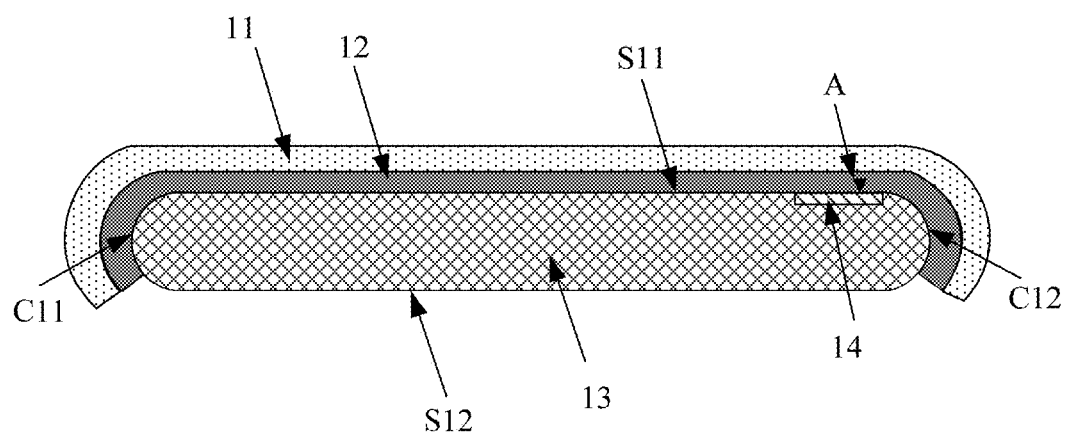
FIG. 2 is a schematic structural diagram of another electronic device according to an embodiment of the present disclosure.

FIG. 2 is a schematic structural diagram of another electronic device according to an embodiment of the present disclosure. Base on the embodiment shown in FIG. 1, in the embodiment shown in FIG. 2, the display screen 11 is a flexible display screen. The body 13 includes a first surface S11, a first side surface C11, and a second side surface C12. The flexible display screen is positioned on the first surface S11, the first side surface C11, and the second side surface C12 of the body 13. The first side surface C11 and the second side surface C12 are opposite to each other. As the antenna of the electronic device, the conductor layer 12 can be fixed on the body 13 along with the fixable display screen, and the shape of the conductor layer 12 may be the shape in which the flexible display screen is fixed on the body 13.

In the embodiment shown in FIG. 2, the first side surface C11 and the second side surface C12 are curved surfaces smoothly connected to the first surface S11, such that the flexible display screen can be smoothly attached to the first side surface C11 and the second side surface C12. The flexible display screen can be curved to avoid sharp corners at the connection between the first surface S11 and the first side surface C11, and the connection between the first surface S11 and the second side surface C12, which can lead to sharp corner bending of the flexible display screen, thereby avoiding the damage of the flexible display screen due to the bending of sharp corners. In other embodiments, the first side surface C11 and the second side surface C12 may also be planes perpendicular to the first surface S11.

As the antenna of the electronic device, the conductor layer 12 can be fixed on the body 13 along with the flexible display screen. The shape of the conductor layer 12 can be the shape in which the flexible display screen is being fixed on the body 13, which can have a relatively large area and a relatively large tuning space, such that the antenna can support 5G communication.

In the embodiment shown in FIG. 2, the body 13 includes a second surface S12 opposite the first surface S11. In some embodiment, a camera module can be disposed on the second surface S12. Further, a camera module can also be disposed between the first surface S11 and the flexible display screen 11. The camera module can be an under-screen camera, and its corresponding display area and conductor layer need to be transparent to perceive ambient light from outside the flexible display screen for imaging.

Figure 3:
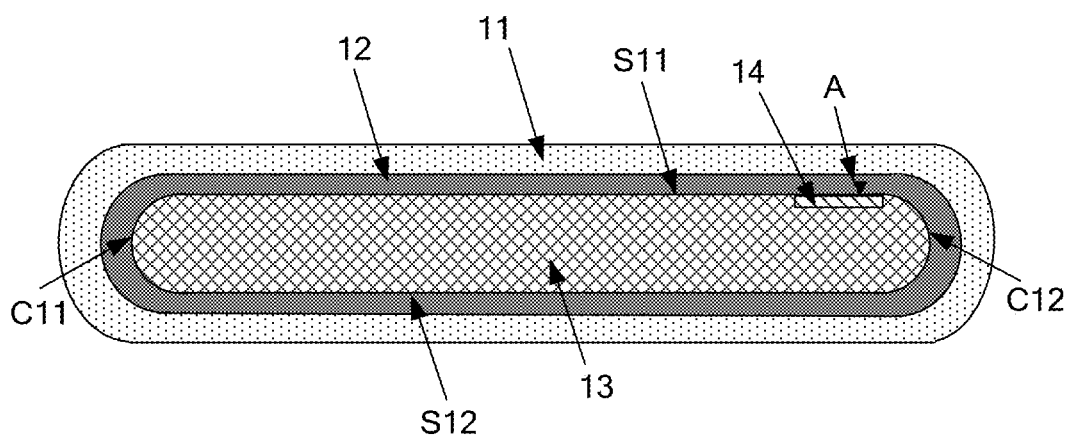
FIG. 3 is a schematic structural diagram of another electronic device according to an embodiment of the present disclosure.

FIG. 3 is a schematic structural diagram of another electronic device according to an embodiment of the present disclosure. Base on the embodiment shown in FIG. 1, in the embodiment shown in FIG. 3, the display screen 11 is a flexible display screen. The body 13 includes a first surface S11, a first side surface C11, a second side surface C12, and the second surface S12. The flexible display screen is fixed around the first surface S11, the first side surface C11, the second side surface C12, and the second surface S12 of the body 13. The first side surface C11 and the second side surface C12 are opposite to each other. As the antenna of the electronic device, the conductor layer 12 can be fixed on the body 13 along with the flexible display screen. The shape of the conductor layer 12 can be the shape in which the flexible display screen is being fixed on the body 13.

In the embodiment shown in FIG. 3, the first side surface C11 and the second side surface C12 are curved surfaces smoothly connected to the first surface S11, and the first side surface C11 and the second side surface C12 are curved surfaces smoothly connected to the second surface S12, such that the flexible display screen can be smoothly attached to the first side surface C11 and the second side surface C12. The flexible display screen can be curved to avoid sharp corners at the connection between the first surface S11 and the first side surface C11, the connection between the first surface S11 and the second side surface C12, the connection between the second surface S12 and the first side surface C11, and the connection between the second surface S12 and the second side surface C12, which can lead to sharp corner bending of the flexible display screen, thereby avoiding the damage of the flexible display screen due to the bending of sharp corners. In other embodiments, the first side surface C11 and the second side surface C12 may also be planes perpendicular to the first surface S11 and the second surface S12.

The body 13 may be a flat plate structure having a third side surface and a fourth side surface opposite to each other. In the embodiment shown in FIG. 3, the flexible display screen can cover the first surface S11, the second surface S12, the first side surface C11, and the conductor layer 12, exposing the third side surface and the fourth side surface.

The flexible display screen may also cover the first surface S11, the second surface S12, the first side surface C11, the second side surface C12, the third side surface, and the fourth side surface. In this case, the conductor layer 12 having a larger size can serve as the antenna of the electronic device, such that the antenna can have a larger uplink frequency and a lower downlink frequency.

In the embodiment shown in FIG. 3, a first camera module can be disposed between the first surface S11 and the flexible display screen, and/or a second camera module can be disposed between the second surface S12 and the flexible display screen. The first camera module and the second camera module may both be under-screen cameras, and their corresponding display areas and conductor layers need to be transparent in order to perceive ambient light from outside the flexible display screen for imaging.

FIG. 4 is a schematic structural diagram of another electronic device according to an embodiment of the present disclosure. Base on the embodiment shown in FIG. 1, in the embodiment shown in FIG. 4, the display screen 11 is a flexible display screen. The body 13 includes a first surface S11, a first side surface C11, a second side surface C12, and the second surface S12. The flexible display screen is fixed around the first surface S11, the first side surface C11, the second side surface C12, a first area S121 of the second surface S12, and a second area S122 of the second surface S12 of the body 13. The first side surface C11 and the second side surface C12 are opposite to each other. The second surface S12 also includes a spacing area S123 positioned between the first area S121 and the second area S122. The first surface S11 and the second surface S12 are opposite to each other. As the antenna of the electronic device, the conductor layer 12 can be fixed on the body 13 along with the flexible display screen. In this case, the antenna frequency can be tuned by adjusting the position and the size of the opening of the spacing area S123 on the second surface S12, such that the antenna frequency can be tuned more flexibly and the frequency range of the required communication system can be obtained.

In the embodiment shown in FIG. 4, the body 13 includes a second surface S12 opposite the first surface S11. In some embodiment, a camera module can be disposed in the spacing area S123. Further, a camera module can also be disposed between the first surface S11 and the flexible display screen. The camera module can be an under-screen camera, and its corresponding display area and conductor layer need to be transparent to perceive ambient light from outside the flexible display screen for imaging.

In the electronic device described in the embodiments of the present disclosure, if a camera module is provided, it can be bound to the body 13.

In the electronic device shown in FIG. 4, the flexible display screen 11 surrounds the body 13. The flexible display screen is fixed to the first surface S11, the first side surface C11, the second side surface C12, the first area S121 of the second surface S12, and the second area S122 of the second surface S12 of the body 13. The arrangement of the antenna feed point A can be as shown in FIG. 5.

Figure 5:
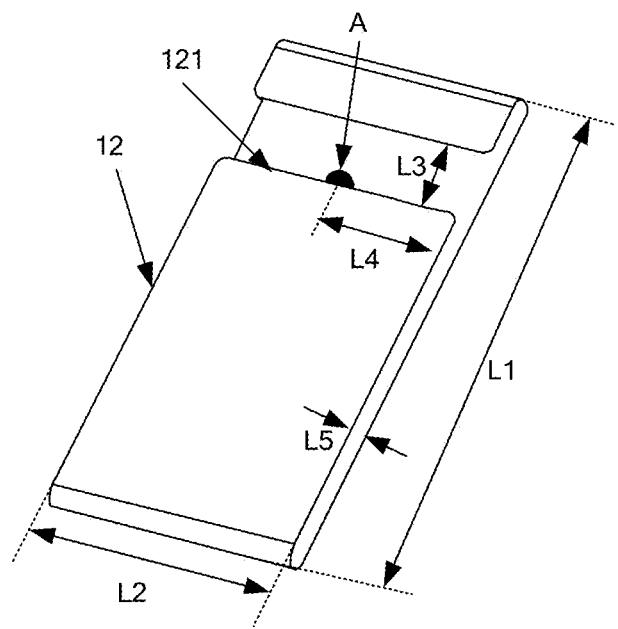
FIG. 5 is a schematic diagram of a structure of an antenna in the electronic device shown in FIG. 4.

FIG. 5 is a schematic diagram of a structure of the antenna in the electronic device shown in FIG. 4. As shown in FIG. 5, the antenna feed point A is positioned at a first position of the conductor layer 12, such that the conductor layer 12 can serve as an antenna of the electronic device to support the full frequency band. FIG. 5 only shows the positions of the conductor layer 12 and the antenna feed point A, and does not show other structures. For the specific structure, reference may be made to the description of FIG. 4, which will not be repeated here.

In the embodiment shown in FIG. 5, the antenna of the electronic device can emit/receive the radio frequency signal of a first frequency band, and form a first current distribution on the conductor layer 12. The first frequency band may cover a low frequency range, such as 600 MHz to 960 MHz. The antenna of the electronic device can emit/receive the radio frequency signal of a second frequency band, and form a second current distribution on the conductor layer 12. The second frequency band may cover a mid-to-high frequency range, such as 1710 MHz to 2700 MHz. The second current distribution may not overlap with the first current distribution.

In the embodiment shown in FIG. 5, the display screen 11 can be a flexible display screen. The first position may be positioned in the middle of a first edge 121 of the conductor layer 12. For example, it may be the midpoint position of the first edge 121. The first edge 121 may correspond to the first area S121 of the second surface S12. The length of the first area S121 may be greater than the length of the second surface S12. By setting the antenna feed point A on the first edge 121, the full frequency band can be covered.

After the conductor layer 12 is circumferentially fixed on the body 13 based on the display screen 11, as shown in FIG. 5, the distance between the two ends of the conductor layer 12 in the length direction of the body 13 is L1 (L1 may be 149.8 mm), the width of the conductor layer 12 is L2 (L2 may be 69.8 mm), and the opening width corresponding to the spacing area S123 is L3 (L3 may be 20.1 mm). The first position is positioned at the midpoint of the first edge 121, therefore, a distance L4 from the first position and the side of the conductor layer 12 is half of L2 (i.e., 34.9 mm). A distance L5 between the conductor layer 12 on both sides of the first surface S11 and the second surface S12 may be 8.2 mm. Under such size conditions, the lower frequency range of 600 MHz to 960 MHz and the high frequency range of 1710 MHz to 2700 MHz can be realized. The values of L1 to L5 can be set based on requirements to adjust different frequency band ranges, which are not specifically limited in the embodiments of the present disclosure.

In the electronic device shown in FIG. 4, the flexible display screen 11 surrounds the body 13. The flexible display screen is fixed to the first surface S11, the first side surface C11, the second side surface C12, the first area S121 of the second surface S12, and the second area S122 of the second surface S12 of the body 13. The arrangement of the antenna feed point A can also be as shown in FIG. 6.

Figure 6:
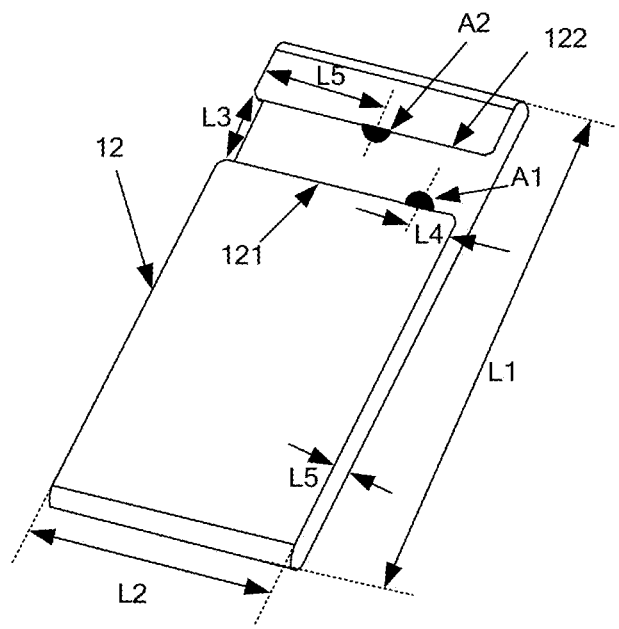
FIG. 6 is a schematic diagram of a structure of the antenna in the electronic device shown in FIG. 4.

FIG. 6 is a schematic diagram of a structure of the antenna in the electronic device shown in FIG. 4. As shown in FIG. 6, the antenna feed point A includes a first antenna feed point A1 and a second antenna feed point A2. The first antenna feed point A1 may be positioned at a first position of the conductor layer 12, and the second antenna feed point A2 may be positioned at a second position of the conductor layer 12, such that the conductor layer 12 can serve as two antennas of the electronic device to support the full frequency band. In some embodiment the first position may be different from the second position. FIG. 6 only shows the positions of the conductor layer 12 and the two antenna feed points, and does not show other structures. For the specific structure, reference may be made to the description of FIG. 4, which will not be repeated here.

In the embodiment shown in FIG. 6, the display screen 11 can be a flexible display screen. Two antenna feed points A, namely the first antenna feed point A1 and the second antenna feed point A2, can be arranged such that a part of the conductor layer 12 can be used as a first antenna, and the other part can be used as a second antenna. The first antenna of the electronic device may be configured to emit/receive radio frequency signals in the first frequency band, and form a first current distribution on the conductor layer 12, such that the first antenna can support the full frequency band. That is, the first frequency band can cover the low frequency range and the mid-to-high frequency range. The second antenna of the electronic device may be configured to emit/receive the radio frequency signals in the second frequency band, and form a second current distribution on the conductor layer 12, such that the second antenna can support the mid-to-high frequency band. That is, the second frequency band can cover the mid-to-high frequency range.

The second current distribution may partially overlap with the first current distribution, such that the mid-to-high frequency band of the second antenna may be positioned in the mid-to-high frequency band of the full frequency band supported by the first antenna.

In some embodiment by adjusting the size of L1 to L5, the frequencies of the first antenna and the second antenna can be adjusted to obtain the required frequency band.

In the embodiment shown in FIG. 6, the length of the first area S121 is set to be greater than the length of the second area S122, such that the first antenna corresponding to the first antenna feed point A1 can cover the full frequency band, and the second antenna corresponding to the second antenna feed point A2 can cover the mid-to-high frequency band, which may be part of the mid-to-high frequency band of the first antenna.

In the embodiment shown in FIG. 6, the mid-to-high frequency range of the second antenna may belong to the mid-to-high frequency range of the first antenna, and serve as a compensation antenna for the mid-to-high frequency band of the first antenna. For example, the mid-to-high frequency range of the first antenna may be set from F1 to F2, and F1 may be less than F2; and the mid-to-high frequency range of the second may be set from f1 to f2, and f1 may be less than f2. f2 may be set to be less than or equal to F2, ideally, f2=F2; and f1 may be set to be greater than or equal to F1, ideally, f1 can be set to be greater than F1. For example, the low frequency band of the first antenna may be 600-900 MHz, and the mid-to-high frequency band may be 1710-2700 MHz. The mid-to-low frequency point f1 of the mid-to-high frequency band of the second antenna may be greater than 1710 MHz and less than 2700 MHz, and the upper frequency band f2 may be equal to 2700 MHz.

In the embodiment shown in FIG. 6, the display screen 11 can be a flexible display screen. The first position may be positioned at the first edge 121 of the conductor layer 12, and the first edge 121 may correspond to the first area S121 of the second surface S12. The second position may be positioned at a second edge 122 of the conductor layer 12, and the second edge 122 may correspond to the second area S122 of the second surface S12. The first position and the second position may not be positioned on the same reference line perpendicular to the first edge 121 and the second edge 122, and physical isolation can be achieved by the spacing area S123 of the second surface S12. For example, the second antenna feed point A2 may be disposed at the midpoint of the second edge 122, and the first antenna feed point A1 may be deposed at the non-midpoint position of the first edge 121.

The arrangement shown in FIG. 6 is different from the arrangement shown in FIG. 5 in that a second antenna feed point A2 is added, the position of the first antenna feed point A1 is adjusted, and the second antenna feed point A2 is set to be positioned in the middle of the second edge 122. Therefore, the distance L5 from the side of the conductor layer 12 may be half of the conductor layer 12, which may be 34.9 mm. The first antenna feed point A1 is on a side of the first edge 121 close to the conductor layer 12, and the distance L4 from the side may be 13 mm.

In the embodiment shown in FIG. 6, the conductor layer can be used as two antennas, such that the first antenna can cover the fully frequency band including the low frequency band and the mid-to-high frequency band, and the second antenna can cover the mid-to-high frequency band as a compensation for the mid-to-high frequency band of the first antenna.

Figure 7:
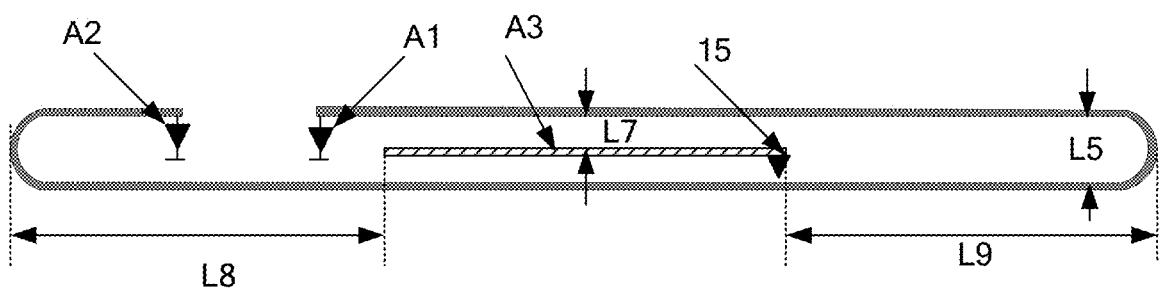
FIG. 7 is a schematic structural diagram of the antenna in the electronic device according to an embodiment of the present disclosure.

FIG. 7 is a schematic structural diagram of the antenna in the electronic device according to an embodiment of the present disclosure. As shown in FIG. 7, based on the embodiment shown in FIG. 6, the electronic device further includes a third antenna 15. The third antenna 15 may be positioned on the third side surface or the fourth side surface of the body 13. In this embodiment, the conductor layer 12 include a first antenna feed point A1 and a second antenna feed point A2. The conductor layer 12 can be used as the first antenna and the second antenna described above, and the implementation method can be as described in the embodiment of FIG. 6. The conductor layer 12 may expose the third side surface and the fourth side surface of the body 13 to facilitate the third antenna 15 to emit/receive radio frequency signals.

In the embodiment shown in FIG. 7, the positions of the first antenna feed point A1 and the second antenna feed point A2 can be the same as shown in FIG. 6, which will not be repeated here. The third antenna 15 can be a conductive component disposed on the body 13, and the existing conductive component on the body 13 can be reused or a conductive component can be added separately on the side of the body 13 as the third antenna 15. The third antenna 15 can include a third antenna feed point A3, which can be connected to the radio frequency circuit 14.

The distance between the third antenna 15 and the area facing the conductor layer 12 and the second surface S12 can be set to L7, for example, L7 may be 0.4 mm. The distance between the third antenna 15 and a first end of the conductor layer 12 can be L9, and the distance from a second end can be L8. In some embodiment L8 may be 51.9 mm and L9 may be 74.9 mm. The first end may be the end of the conductor layer 12 corresponding to the first side surface C11, and the second end may be the end of the conductor layer 12 corresponding to the second side surface C12.

The third antenna 15 can be disposed on the side of the spacing area S123 close to the first area S121, and disposed opposite the first area S121, such that the third antenna 15 can support the low frequency band. The low frequency band covered by the third antenna 15 may belong to the low frequency band in the full frequency band covered by the first antenna.

The body may include a circuit board. In the embodiments shown in FIG. 4 to FIG. 7, the body 13 may include a circuit board, and external electronic components, such as camera modules and speakers may be arranged at the position of the circuit board corresponding to the spacing area S123. At this time, the structure of the electronic device may be as shown in FIG. 8.

Figure 8:
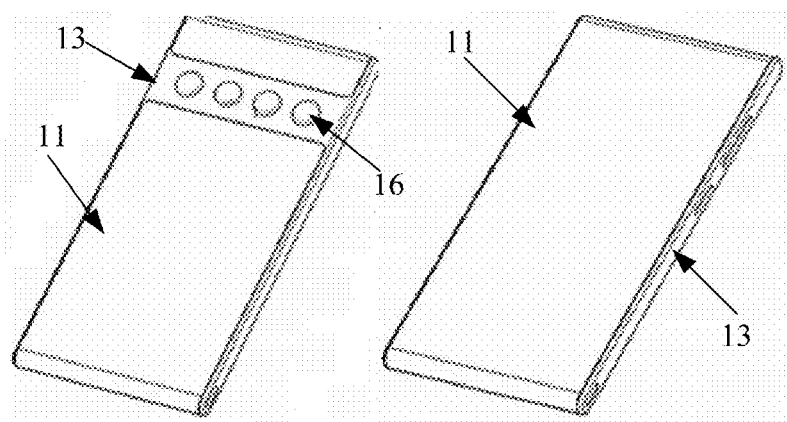
FIG. 8 is schematic structural diagram of another electronic device according to an embodiment of the present disclosure.

FIG. 8 is schematic structural diagram of another electronic device according to an embodiment of the present disclosure. The left image in FIG. 8 is a view facing the second surface of the body 13, and the right image is a view facing the first surface of the body 13. One or more external electronic components 16 can be disposed on the side of the second surface of the body 13.

The performance of the antennas in the electronic device describe in the present disclosure will be described below with specific data.

Figure 9:
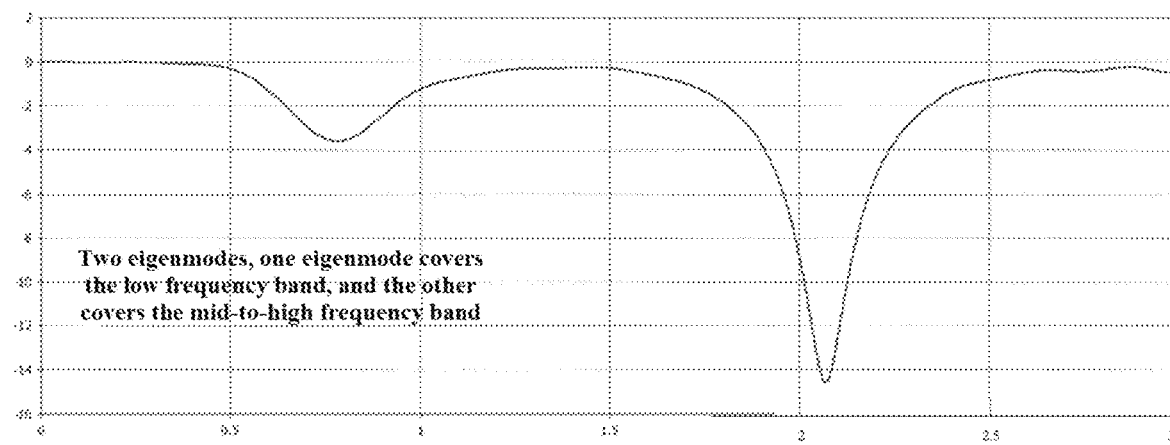
FIG. 9 is a return loss diagram of using a conductor layer as an antenna in the electronic device.

FIG. 9 is a return loss diagram of using a conductor layer as an antenna in the electronic device, where the vertical axis is loss in dB, and the horizontal axis is frequency in GHz. Based on FIG. 9, this method has two eigenmodes, in which one eigenmode covers the low frequency band, and the other eigenmode covers the mid-to-high frequency band. The low frequency band may be 600-900 MHz, and the mid-to-high frequency band may be 1710-2700 MHz.

Figure 10:
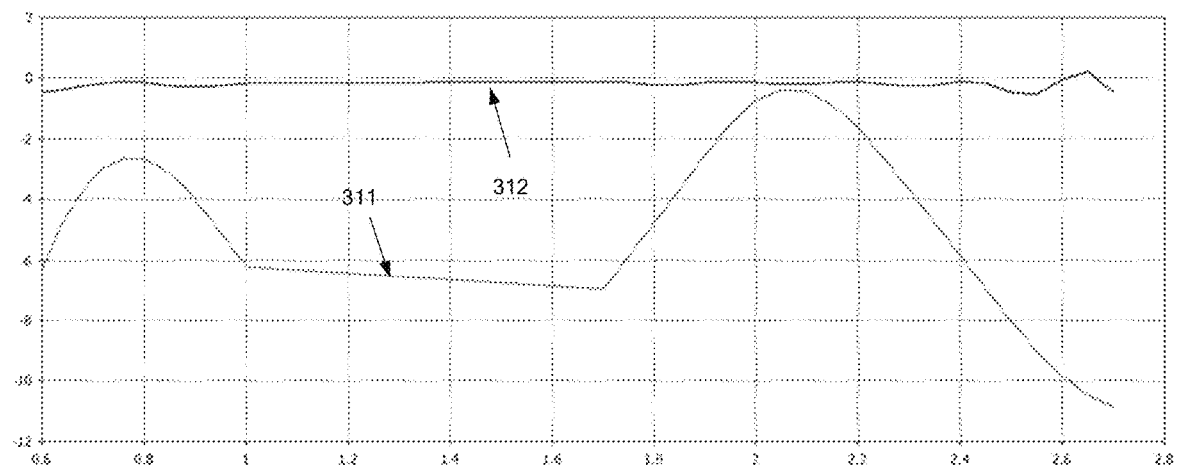
FIG. 10 is an efficiency diagram of using the conductor layer as an antenna in the electronic device.

FIG. 10 is an efficiency diagram of using the conductor layer as an antenna in the electronic device, where the vertical axis is efficiency in dB, and the horizontal axis is frequency in GHz. Curve 311 is the efficiency of the antenna system, and curve 312 is the efficiency of the radiation efficiency. Based on FIG. 10, it can be seen that this radiation method has good radiation efficiency and can effectively radiate in the full frequency band.

Figure 11:
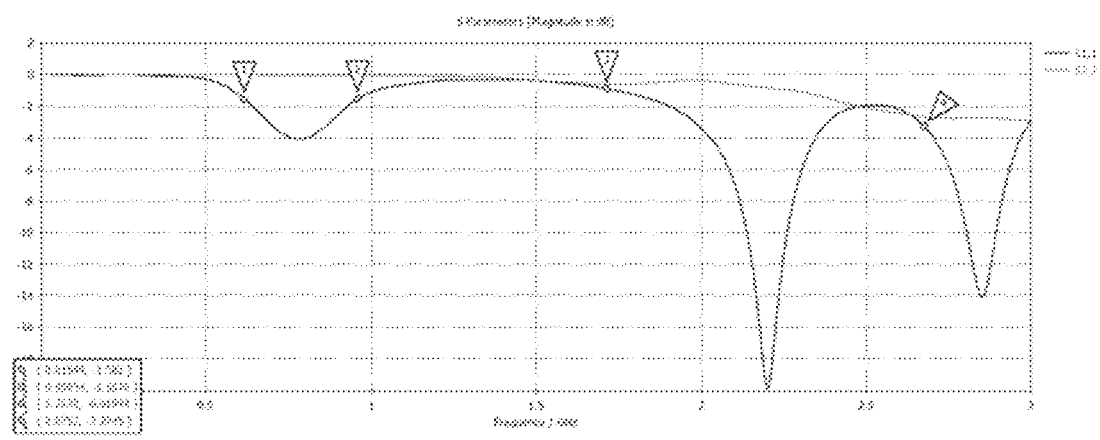
FIG. 11 is a return loss diagram of using the conductor layer as two antennas in the electronic device.

FIG. 11 is a return loss diagram of using the conductor layer as two antennas in the electronic device, where the vertical axis is loss in dB, and the horizontal axis is frequency in GHz. Based on curve S11 of the first antenna in FIG. 11, it can be seen that it covers a low frequency band and a mid-to-high frequency band. Based on curve S22 of the second antenna, it can be seen that the second antenna can compensate the mid-to-high frequency band of the first antenna.

Figure 12:
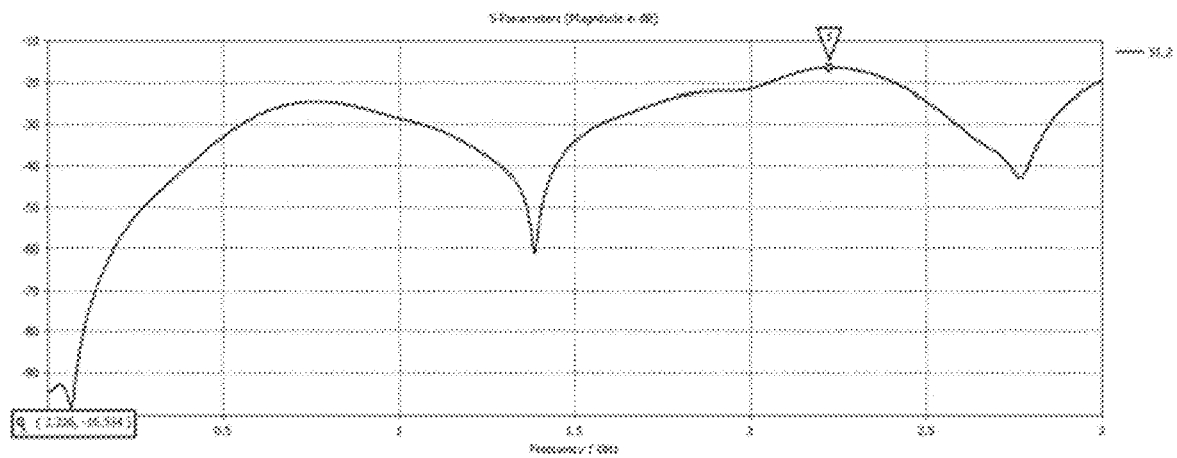
FIG. 12 is a schematic diagram of an isolation of using the conductor layer as two antennas in the electronic device.

FIG. 12 is a schematic diagram of an isolation of using the conductor layer as two antennas in the electronic device, where the vertical axis is isolation in dB, and the horizontal axis is frequency in GHz. Curve S12 in FIG. 12 represents the isolation curve of the first antenna and the second antenna. Based on FIG. 12, it can be seen that the first antenna and the second antenna have better isolation.

Figure 13:
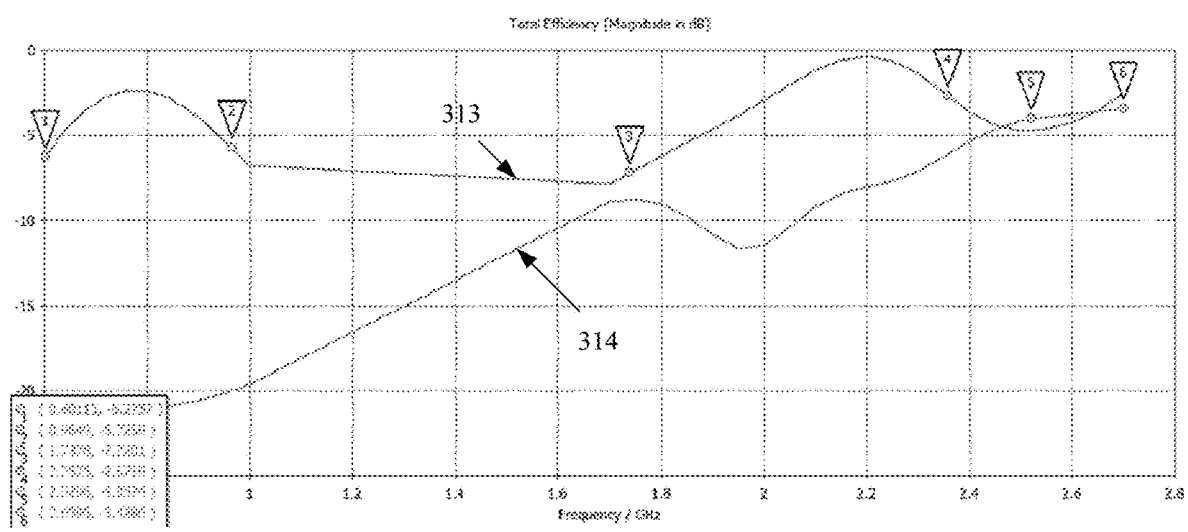
FIG. 13 is an efficiency diagram of using the conductor layer as two antennas in the electronic device.

FIG. 13 is an efficiency diagram of using the conductor layer as two antennas in the electronic device, where the vertical axis is efficiency in dB, and the horizontal axis is frequency in GHz. Curve 313 is the system efficiency of the first antenna, and curve 314 is the system efficiency of the second antenna. It can be seen that the first antenna can effectively radiate at low, medium, and high frequencies, and the second antenna can effectively radiate at medium and high frequencies.

Figure 14:
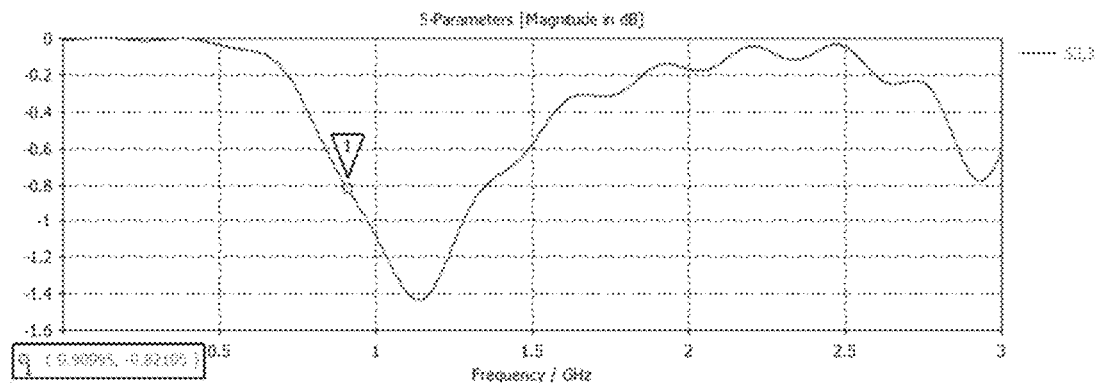
FIG. 14 is a return loss diagram of a third antenna in the electronic device.

When the conductor layer is used as two antennas and a third antenna is added, the return loss of the first antenna and the second antenna may be the same as in FIG. 11. The return loss of the third antenna is shown in FIG. 14. FIG. 14 is a return loss diagram of the third antenna in the electronic device, where the vertical axis is loss in dB, and the horizontal axis is frequency in GHz. Based on curve 33 of the third antenna, it can be seen that better low frequency characteristics can be obtained at point 1, therefore, the third antenna can compensate for the low frequency band of the first antenna.

Figure 15:
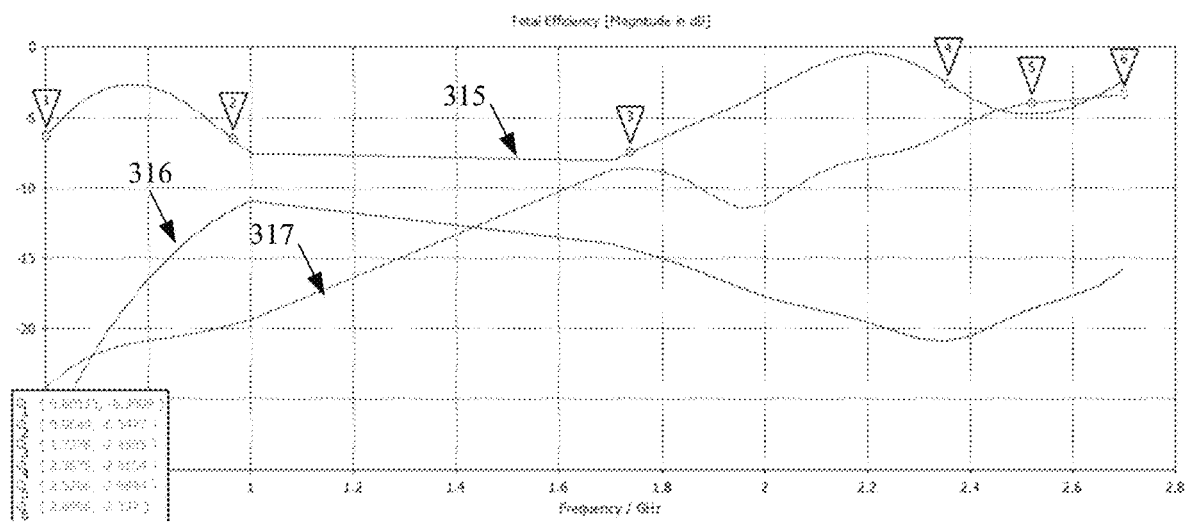
FIG. 15 is an efficiency diagram of the electronic device having the first antenna to the third antenna at the same time.

FIG. 15 is an efficiency diagram of the electronic device having the first antenna to the third antenna at the same time, where the vertical axis is efficiency in dB, and the horizontal axis is frequency in GHz. Curve 315 is the system efficiency of the first antenna, which can effectively radiate in the low frequency band and the mid-to-high frequency band. Curve 316 is the system efficiency of the second antenna, which can effectively radiate in the mid-to-high frequency band. Curve 317 is the system efficiency of the third antenna, which can effectively radiate in the low frequency band.

Figure 16:
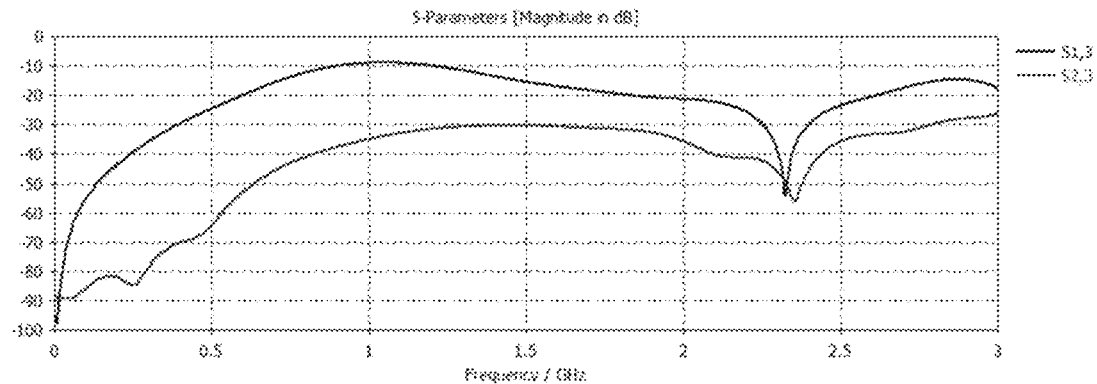
FIG. 16 is a schematic diagram of the isolation of the electronic device having the first antenna to the third antenna at the same time.

FIG. 16 is a schematic diagram of the isolation of the electronic device having the first antenna to the third antenna at the same time, where the vertical axis is isolation in dB, and the horizontal axis is frequency in GHz. Curve S13 represents the isolation between the first antenna and the third antenna, and curve S23 represents the isolation between the second antenna and the third antenna. The isolation between the first antenna and the second antenna is the same as the isolation shown in FIG. 12, and it can be seen that each antenna has a better isolation.

Figure 17:
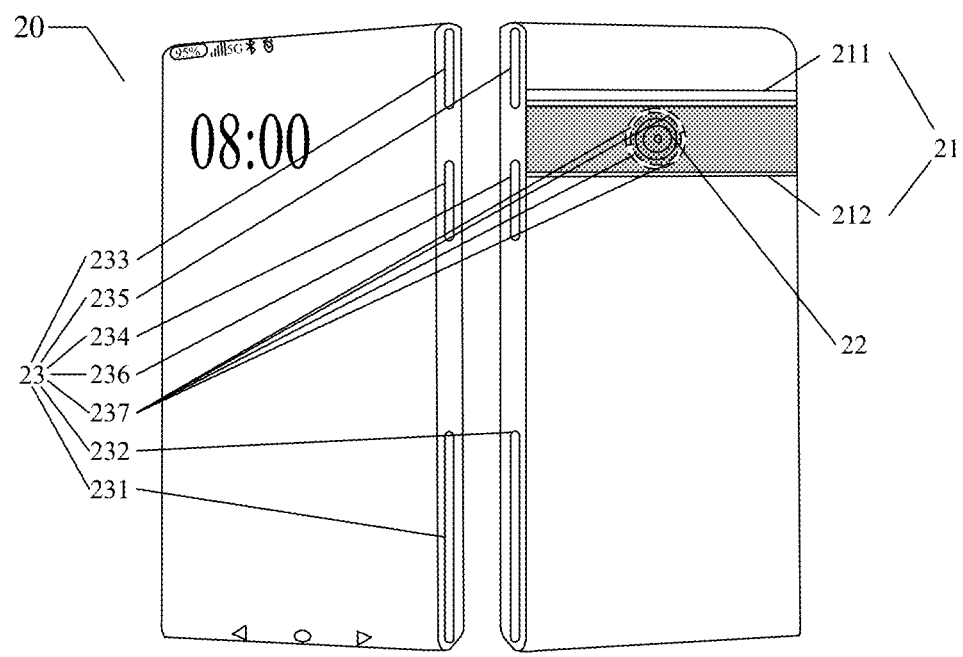
FIG. 17 is a schematic diagram of a composition structure of the electronic device according to an embodiment of the present disclosure.

FIG. 17 is a schematic diagram of a composition structure of the electronic device according to an embodiment of the present disclosure. As shown in FIG. 17, an electronic device 20 includes a display screen 21, a first camera 22, and an antenna system 23.

In some embodiment a first end 211 and a second end 212 of the display screen 21 can be positioned on the rear surface of the electronic device 20. The display screen 21 may cover the upper, front, and lower sides of the electronic device 20, and may not cover a first side and a second side the electronic device 20. In some embodiment the first side of the electronic device 20 may be opposite the second side of the electronic device 20, and the lengths of the long sides of the first side and the second side may be greater than the lengths of the long sides of the upper side and the lower side. That is, the first side and the second side may be the left and right sides of the electronic device.

The first camera 22 may be disposed on the rear surface and positioned between the first end 211 of the display screen 11 and the second end 212 of the display screen 11. The antenna system 23 may be configured to emit or receive radio frequency signals. The antenna system 23 may be disposed on the first side and second side of the electronic device 20, and the area around the first camera 22 not covered by the display screen 11.

In the embodiment shown in FIG. 17, the display screen 11 surrounds the upper and lower sides to form a top to bottom surround display screen. The first end 211 of the display screen 21 is on the rear surface of the electronic device 20, and is the end close to the upper edge of the first camera 22. The second end 212 of the display screen 21 is also positioned on the rear surface of the electronic device 20, and is the end close to the lower edge of the first camera 22. The area of the rear surface other than the first camera 22 is covered by the display screen 21, and the screen-to-body ratio can reach more than 180%, which greatly increases the screen-to-body ratio, thereby improving the visual experience.

In some embodiment the first camera 22 may be a single camera or multiple cameras, such as a color camera, a black and white camera, a wide-angle camera, a telephoto camera, etc.

Consistent with the present disclosure, the electronic device can include a display screen, a first camera, and an antenna system. The first end and the second end of the display screen may be positioned on the rear surface of the electronic device. The display screen may cover the upper, front, and lower sides of the electronic device, and may not cover the first side and the second side of the electronic device. In some embodiment the first side of the may be opposite the second side, and the lengths of the long sides of the first side and the second side may be greater than the lengths of the long sides of the upper side and the lower side. The first camera can be disposed on the rear surface of the electronic device and between the first end and the second end of the display screen. The antenna system can be used to emit or receive radio frequency signals. The antenna system can be disposed on the first side and the second side of the electronic device, and the area of the first camera not covered by the display screen. The display screen of the electronic device of the present disclosure can surround the upper and lower sides to form a top to bottom surround display screen, and the antenna can be disposed on the left and right sides of the electronic device without the display screen, and around the camera. In this way, while ensuring that the antenna is not affect, the screen-to-body ratio can be increased, thereby improving the visual experience.

To ensure that antennas can emit and receive radio frequency signals normally, not only the antenna system 23 of the electronic device 20 needs to be away from metal components, it also needs to be isolated from batteries, oscillators, shields, etc. For an electronic device with a top to bottom surround screen as the display screen 21, the front, upper, and lower sides of the electronic device 20 are all surrounded by the display screen 21, which reduces the clearance area and increases the difficulty of antenna design. In addition, with the development of the fifth generation mobile communication technology (5G), the number of antennas of the electronic device 20 has increased from 4-5 antennas in the fourth generation mobile communication technology (4G) to 9-10 antennas, leading to new challenges in antenna design.

In some embodiment, as shown in FIG. 17, the antenna system 23 can include a fourth antenna 231 and a fifth antenna 232. In some embodiment, the fourth antenna 231 may be disposed in a first area of the first side, and the fifth antenna 232 may be disposed in a second area of the second side. A first distance between the center point of the first area and the lower side of the electronic device may be less a first distance threshold, and a second distance between the center point of the second area and the lower side of the electronic device may be less than the first distance threshold.

In some embodiment, to reduce the influence on the communication strength when the user holds the electronic device 20, the fourth antenna 231 and the fifth antenna 232 can be respectively arranged at the lower ends of the first side and the second side. That is, the center point of the first area and the center point of the second area can be set close to the lower side to reduce the effect on the signal strength of the low frequency band of the fourth antenna 231 and the fifth antenna 232 from the outside, thereby stimulating the whole board mold to achieve the desired effect.

The fourth antenna 231 and the fifth antenna 232 may be main antennas, and the fourth antenna 231 and the fifth antenna 232 may be switched to each other during the process of emitting or receiving radio frequency signals. Once the electronic device 20 is affected by other factors such as the user's hand, the left and right antenna can be switched to minimize the interference received by the electronic device 20 and maintain the best performance.

The two main antennas, the fourth antenna 231 and the fifth antenna 232, may be the main wireless wide area network (WWAN) antennas. These two antennas may be respectively disposed at the bottom positions on both sides of the electronic device 20 to ensure that the specific absorption rate (SAR) can be satisfied while effectively avoiding the influence of the user's hand on the signal strength of the electronic device 20.

In some embodiment the frequency bands of the fourth antenna 231 and the fifth antenna 232 may cover ultra-low frequency, low frequency, intermediate frequency, high frequency, and ultra-high frequency, and the cover range may be 617-900 MHz, 1710-2690 MHz, and 3300-5000 MHz.

In some embodiment, the first distance may be equal to the second distance, thereby realizing the symmetrical arrangement of the fourth antenna 231 and the fifth antenna 232.

Figure 18:
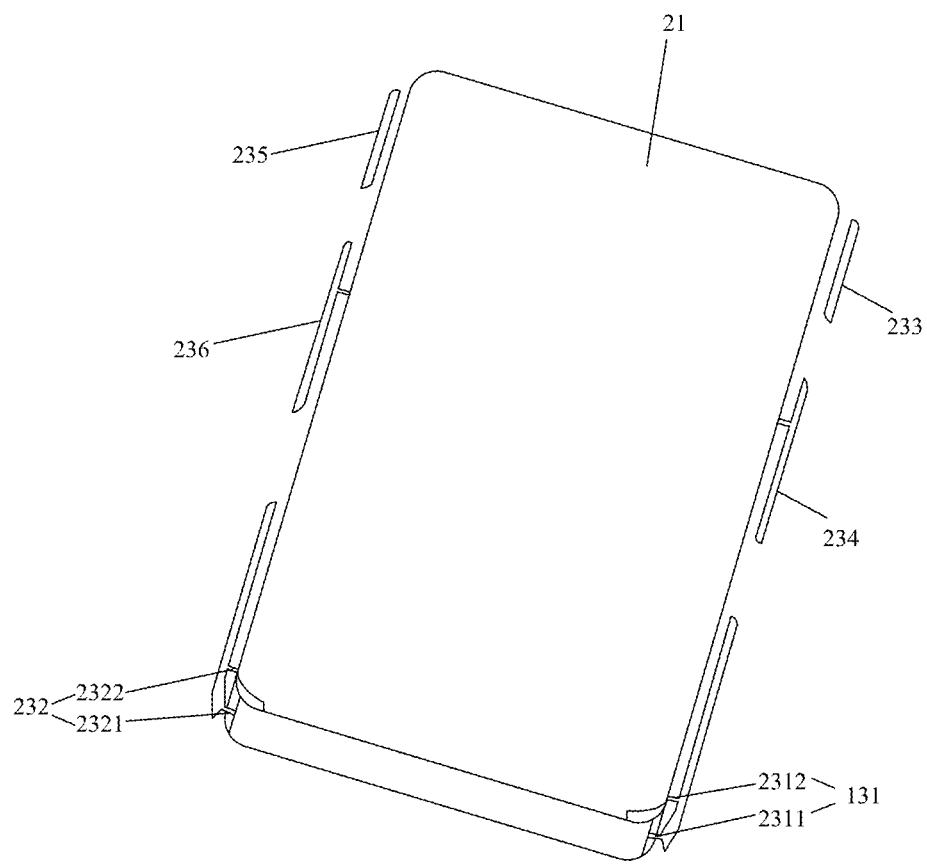
FIG. 18 is a schematic diagram of another composition structure of the electronic device according to an embodiment of the present disclosure.
Figure 19:
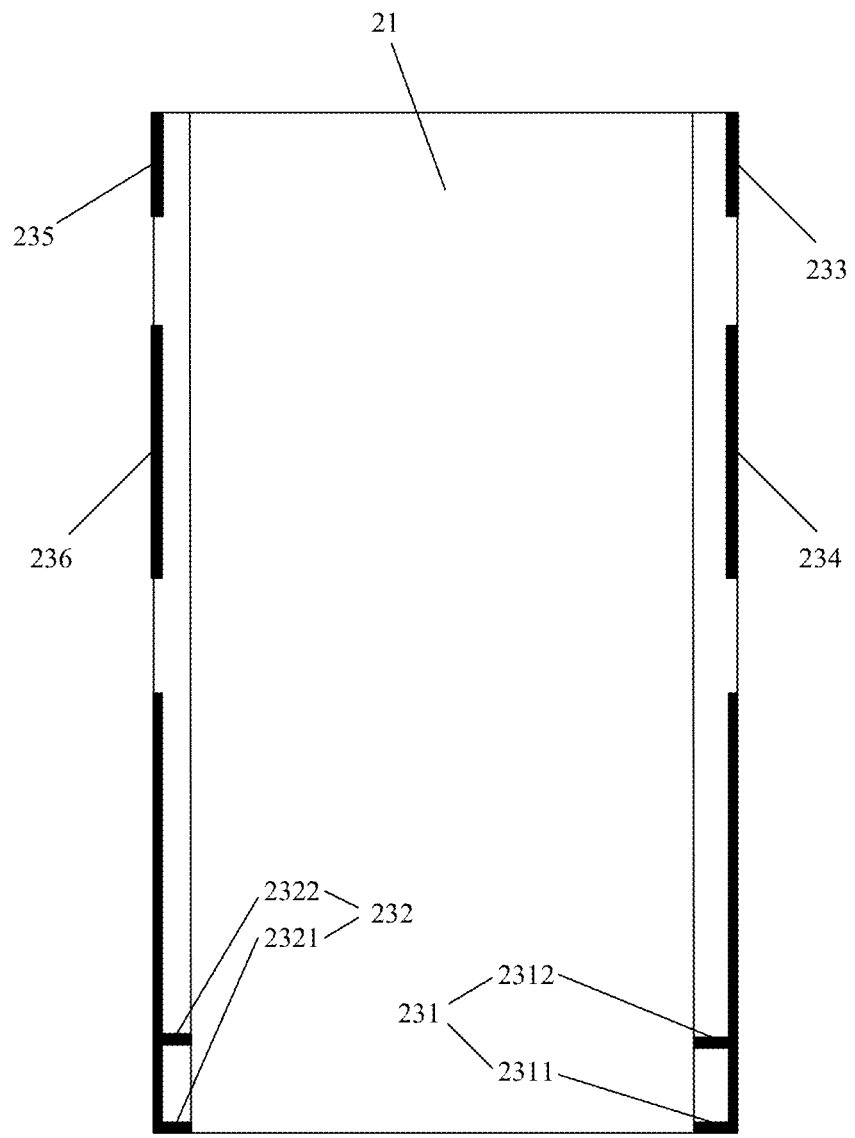
FIG. 19 is a front view of a front surface of the electronic device according to an embodiment of the present disclosure.

FIG. 18 is a schematic diagram of another composition structure of the electronic device according to an embodiment of the present disclosure. For the sake of clarity, FIG. 18 does not show the frame of the electronic device 20 other than the first side and the second side of the electronic device 20 including the antennas. FIG. 19 is a front view of a front surface of the electronic device according to an embodiment of the present disclosure. As shown in FIG. 18 and FIG. 19, a third distance between a ground pin 2311 of the fourth antenna 231 and the low side of the electronic device is shorter than a fourth distance between a feed pin 2312 of the fourth antenna 231 and the lower side of the electronic device; and a fifth distance between a ground pin 2321 of the fifth antenna 232 and the lower side of the electronic device is shorter than a sixth distance between a feed pin 2322 of the fifth antenna 232 and the lower side of the electronic device. The ground pin 2311 of the fourth antenna 231 and the ground pin 2321 of the fifth antenna 232 can be disposed at positions close to the lower side of the electronic device. That is, the feed pin 2312 of the fourth antenna 231 can be disposed above the ground pin 2311, and the feed pin 2322 of the fifth antenna 232 can be set above the ground pin 2321, which can further avoid the influence on the signal strength when the electronic device 20 is being held.

In some embodiment, the antenna system 23 may further include a sixth antenna 233 configured to connect to the global positioning system (GPS). The sixth antenna 233 can be disposed on the first side of the electronic device, and a seventh distance between the center point of a third area and the upper side of the electronic device may be shorter than a second distance threshold. In the embodiment shown in FIG. 18 and FIG. 19, the sixth antenna 233 is disposed at the upper area of the first side of the electronic device 20, which can achieve better upper hemisphere performance and ensure strong signal strength during GPS communication. In the embodiments of the present disclosure, the sixth antenna 233 may be a GPS/Wi-Fi 2.4G/5G diversity antenna.

In some embodiment, the antenna system 23 may further include a seventh antenna 234. The seventh antenna 234 may be a low, medium, and high frequency diversity antenna, which can be disposed between the sixth antenna 233 and the fourth antenna 231. In some embodiment, the low frequency range of the seventh antenna 234 may be FR1.

In some embodiment, the antenna system 23 may further include an eighth antenna 235 configured to connect to Wi-Fi, and disposed at a fourth area of the second side of the electronic device. An eighth distance between the center point of the fourth area and the upper side of the electronic device may be shorter than a third distance threshold. In the embodiment shown in FIG. 18 and FIG. 19, the eighth antenna 235 is disposed in the upper area of the second side of the electronic device, and the eighth antenna 235 may be a Wi-Fi 2.4G/5G diversity antenna.

In some embodiment, the antenna system 23 may further include a ninth antenna 236. The ninth antenna 236 may be a low, medium, and high frequency diversity antenna disposed between the eighth antenna 235 and the fifth antenna 232. In some embodiment, the frequency range of the low frequency of the ninth antenna 236 may be FR1, and the coverage range of FR1 may be 450-6000 MHz, that is, sub-6 gigahertz (GHz).

In some embodiment, the antenna system 23 may further includes N tenth antennas 237. The tenth antennas 237 may be low frequency diversity antennas with a frequency range of FR1 disposed on the frame of the first camera 22. In some embodiment, N may be a positive integer. The antenna system 23 shown in FIG. 17 and FIG. 19 includes four tenth antennas 237.

Figure 20:
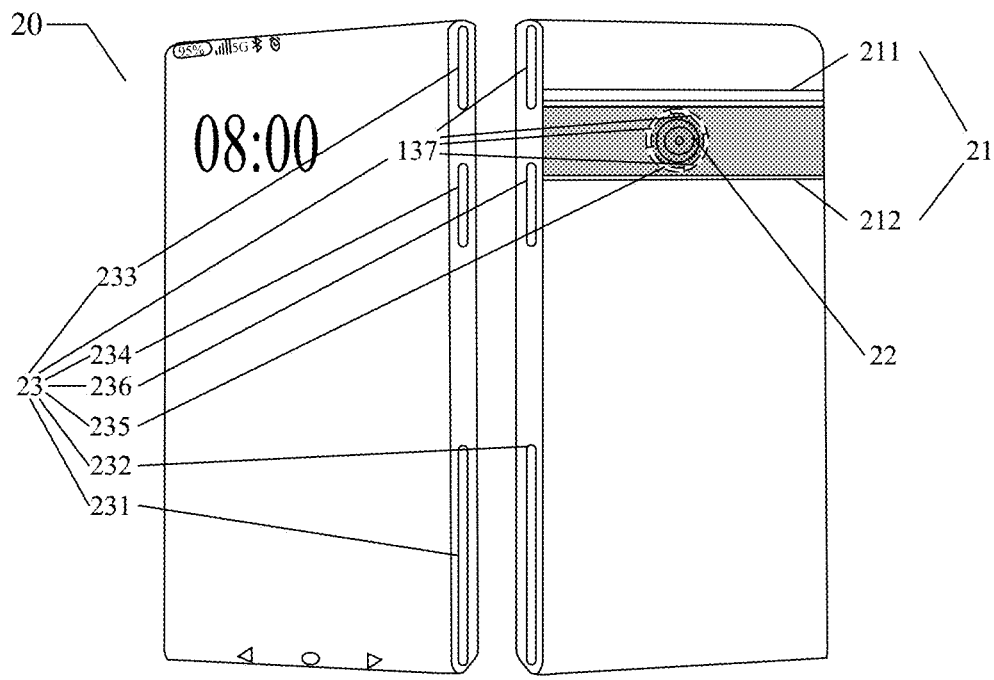
FIG. 20 is a schematic diagram of another composition structure of the electronic device according to an embodiment of the present disclosure.

FIG. 20 is a schematic diagram of another composition structure of the electronic device according to an embodiment of the present disclosure. As shown in FIG. 20, the positions of the fourth antenna 231, the fifth antenna 232, the sixth antenna 233, and the seventh antenna 234 are the same as those of the embodiment shown in FIG. 17. For details, reference can be made to the description of the foregoing embodiments.

In the embodiment shown in FIG. 20, the eighth antenna 235 is used to connect to Wi-Fi and is disposed on the frame of the first camera 22, and the tenth antennas 237 are low frequency diversity antennas with a frequency range of FR1. One of the tenth antennas 237 is disposed on the second side of the electronic device, and the remaining N−1 tenth antennas 237 are disposed on the frame of the first camera 22. In some embodiment the eighth distance between the center point of the fourth area and the upper side of the electronic device may be shorter than the third distance threshold, and N may be a positive integer. The ninth antenna 236 may be a low, medium, and high frequency diversity antenna disposed between the tenth antennas 237 and the fifth antenna 232 on the second side of the electronic device. In some embodiment the low frequency range of the ninth antenna 236 may be FR1.

In some embodiment, the manufacturing process of the fourth antenna 231 to the tenth antenna 237 may include one or more of a metal part process, a metal strip laying process, a cold spray process, and a laser direct forming process. The fourth antenna 231 to the tenth antenna 237 may be an antenna with in inverted F-shaped structure or an antenna with a loop structure. Of course, these antennas may also be adjusted to other structures corresponding to the material or implementation process of the antenna.

Figure 21:
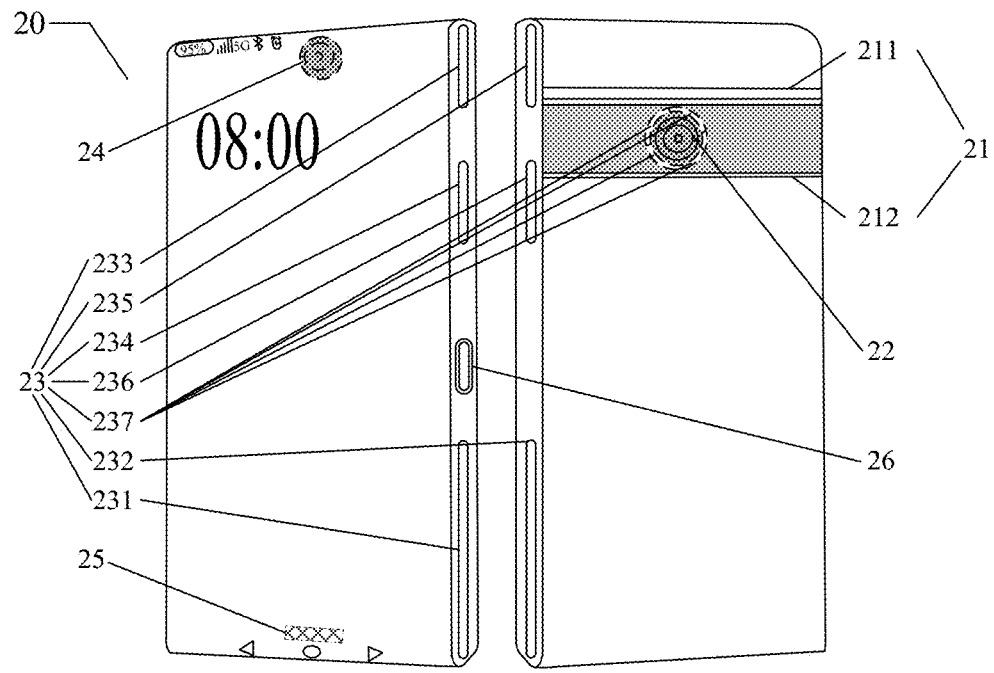
FIG. 21 is a schematic diagram of another composition structure of the electronic device according to an embodiment of the present disclosure.

FIG. 21 is a schematic diagram of another composition structure of the electronic device according to an embodiment of the present disclosure. As shown in FIG. 21, the electronic device 20 further includes a second camera 24 and an earpiece 25. In some embodiment, the second camera may be an under-screen camera disposed on the front surface of the electronic device 20, and the earpiece may be an under-screen earpiece that conducts sound waves by bone conduction. In the embodiment shown in FIG. 21, the second camera 24 is an under-screen camera, and the earpiece 25 is an under-screen earpiece. The second camera 24 and the earpiece 25 are actually blocked by the display screen 21, therefore, they are shown by dotted lines in FIG. 21.

In some embodiment, the electronic device 20 may further include a charging interface 26 for connecting a charging cable of the electronic device 20, and the charging interface 26 may be disposed between the fourth antenna 231 and the seventh antenna 234.

In some embodiment, the charging interface 26 may also be disposed between the fifth antenna 232 and the ninth antenna 236.

It should be noted that the various embodiments in the present specification are described in a progressive manner, and each embodiment focuses on differences from other embodiments, and the same similar parts between the various embodiments can be referred to each other.

It is to be understood that terms used herein with reference to device or element orientation (such as, terms like "center", "longitudinal", "lateral", "length", "width", "height", "up", "down", "front", "rear", "left", "right", "vertical", "horizontal", "top", "bottom", "inside", "outside", "clockwise", "anticlockwise", "axial", "radial", "circumferential") are only used to simplify description of the present disclosure, and do not indicate or imply that the device or element referred to must have or operated in a particular orientation. These terms should not be understood as limitations to the present disclosure.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which can be understood by those skilled in the art according to specific situations.

It should be noted that in the present disclosure, relational terms such as first and second, etc., are only used to distinguish an entity or operation from another entity or operation, and do not necessarily imply that there is an actual relationship or order between the entities or operations. The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . " does not exclude inclusion of another same item in the process, method, apparatus, or device that includes the item Although the embodiments of the present disclosure have been shown and described above, it can be understood that the above embodiments are exemplary and should not be construed as limitations on the present disclosure. Those skilled in the art can change, modify, substitute, or vary the above embodiments within the scope of the present disclosure. The scope of the present disclosure is defined by the appended claims and their equivalents.

What is claimed is:

1. An electronic device, comprising:
   a body;
   a display screen being flexibly fixed to the body, covering a first part the body, a first area of a second part of the body, wherein the first part of the body is a front of the body, the second part of the body is not the front of the body, and a second area of the second part of the body including a spacing area not covered by the display screen;
   a conductor layer, having a shape based on the display screen, is fixed on the body, the spacing area including a part of the conductor layer;
   at least part of an antenna of the electronic device disposed in the spacing area to emit or receive radio frequency signals; and
   a radio frequency circuit being connected to an antenna feed point positioned on the conductor layer at a first edge of the first area of the second part of the body at the spacing area, wherein the antenna including the conductor layer.

2. The electronic device of claim 1, wherein:
   the flexible display screen is positioned on a first surface, a first side surface, and a second side surface of the body, the first side surface being opposite the second side surface; or
   the flexible display screen is fixed around the first surface, the first side surface, the second side surface, and a second surface of the body, the first side surface being opposite the second side surface, the first surface being opposite the second surface; or
   the flexible display screen is fixed around the first surface, the first side surface, the second side surface, a first area of the second surface, and a second area of the second surface of the body, the first side surface being opposite the second side surface, the first surface being opposite the second surface, the second surface including the spacing area between the first area and the second area.

3. The electronic device of claim 2, wherein:
   the flexible display screen is fixed on the first surface, the first side surface, the second side surface, the first area of the second surface, and the second area of the second surface of the body;
   a first antenna feed point is positioned at the first position of the conductor layer; and
   a second antenna feed point is positioned at a second position of the conductor layer for the conductor layer to be used as two antennas of the electronic device to support the full frequency band, the first position being different from the second position.

4. The electronic device of claim 3, wherein:
   a first antenna of the electronic device emits or receives radio frequency signals in the first frequency band, and forms the first current distribution on the conductor layer for the first antenna to support the full frequency band;
   a second antenna of the electronic device emits or receives radio frequency signals in the second frequency band, and forms the second current distribution on the conductor layer for the second antenna to support the mid-to-high frequency band, the second current distribution partially overlapping with the first current distribution.

5. The electronic device of claim 4, wherein:
   the first position is positioned at the first edge of the conductor layer, the first edge corresponding to the first area of the second surface; and
   the second position is positioned at a second edge of the conductor layer, the second edge corresponding to the second area of the second surface, the first position and the second positions not being positioned on a same reference line perpendicular to the first edge and the second edge, the first position being isolated form the second position through the spacing area of the second surface.

6. The electronic device of claim 4, further comprising:
   a third antenna positioned on a third side surface or a fourth side surface of the body, the third side surface and the fourth side surface being two other opposite side surfaces of the body.

7. The electronic device of claim 1, wherein:
   the antenna of the electronic device emits or receives the radio frequency signals of a first frequency band to form a first current distribution on the conductor layer, the first frequency band covering a low frequency band; and
   the antenna of the electronic device emits or receives the radio frequency signals of a second frequency band to form a second current distribution on the conductor layer, the second frequency band covering a mid-to-high frequency band, the second current distribution not overlapping with the first current distribution.

8. The electronic device of claim 7, wherein:
   the display screen is a flexible display screen, and the first position is positioned in the middle of a first edge of the conductor layer, the first edge corresponding to the first area of the second surface.

9. The electronic device of claim 1, wherein:
   the display screen has a first end and a second end of the display screen being positioned on a back of the body as the second part of the body of the electronic device, the display screen further covering an upper side, a lower side of the body of the electronic device without covering a first side and a second side of the body of the electronic device, the first side of the second side being opposite to each other, and lengths of long sides of the first side and the second side being greater than lengths of long sides of the upper side and the lower side;

a first camera is disposed at the spacing area on the back of the body and positioned between the first end and the second end; and an antenna system is configured to emit or receive radio frequency signals, the antenna system being disposed on the first side and the second side, and in the spacing area not covered by the display screen.

10. The electronic device of claim 9, wherein:
the antenna system includes a fourth antenna disposed in a first area of the first side, and a fifth antenna disposed in a second area of the second side, a first distance between a center point of the first area and the lower side being less than a first distance threshold, a second distance between a center point of the second area and the lower side being less than the first distance threshold, the fourth antenna and the fifth antenna being main antennas, and the first antenna and the second antenna being configured to switch between each other when emitting or receiving radio frequency signals.

11. The electronic device of claim 10, wherein:
the first distance and the second distance are equal.

12. The electronic device of claim 10, wherein:
a third distance between a ground pin of the first antenna and the lower side is shorter than a fourth distance between a feed pin of the first antenna and the lower side; and
a fifth distance between a ground pin of the second antenna and the lower side is shorter than a sixth distance between a feed pin of the second antenna and the lower side.

13. The electronic device of claim 10, wherein:
the antenna system further includes a sixth antenna configured to connect to a global positioning system (GPS) disposed in a third area of the first side, a seventh distance between a center point of the third area and the upper side being shorter than a second distance threshold; and a seventh antenna, the seventh antenna being a low, medium, and high frequency diversity antenna disposed between the sixth antenna and the fourth antenna, the low frequency range of the seventh antenna being in the range of sub-6 GHz.

14. The electronic device of claim 13, wherein:
the antenna system further includes an eighth antenna configured to connect to Wi-Fi and disposed in a fourth area of the second side, an eighth distance between a center point of the fourth area and the upper side being less than a third distance threshold; a ninth antenna, the ninth antenna being a low, medium, and high frequency diversity antenna disposed between the eighth antenna and the fifth antenna, the low frequency range of the ninth antenna being in a range of sub-6 GHz; and N tenth antennas, the tenth antennas being lower frequency diversity antennas with a frequency range of sub-6 GHz disposed on a frame of the first camera, N being a positive integer.

15. The electronic device of claim 13, wherein:
the antenna system further includes an eighth antenna configured to connect to Wi-Fi and disposed at a frame of the first camera; N tenth antenna, the tenth antenna being a low frequency diversity antenna with a frequency range of sub-6 GHz, one of the tenth antennas being disposed in a fourth area of the second side, and the remaining N−1 tenth antennas being disposed on the frame of the first camera, an eighth distance between a center point of the fourth area and the upper side being less than a third distance threshold, N being a positive integer; and a ninth antenna, the ninth antenna being a low, medium, and high frequency diversity antenna disposed between the tenth antenna on the second side and the fifth antenna, the low frequency range of the ninth antenna being in a range of sub-6 GHz.

16. The electronic device of claim 15, wherein:
a manufacturing process of the fourth antenna to the tenth antenna includes one or more of a metal part process, a metal strip laying process, a cold spray process, and a laser direct forming process.

17. The electronic device of claim 15, further comprising:
a charging interface configured to connect a charging cable of the electronic device, the charging interface being disposed between the fourth antenna and the seventh antenna, or between the fifth antenna and the ninth antenna.

18. The electronic device of claim 9, further comprising:
a second camera, the second camera being an under-screen camera disposed on the front surface of the electronic device; and
an earpiece, the earpiece being an under-screen earpiece configured to use bone conduction to conduct sound waves.

* * * * *